United States Patent
Schoenly et al.

(10) Patent No.: US 12,425,229 B2
(45) Date of Patent: Sep. 23, 2025

(54) OFFLINE DECENTRALIZED IDENTITY-BASED COMMUNICATION FOR APPLICATIONS

(71) Applicant: American Express Travel Related Services Company, Inc., New York, NY (US)

(72) Inventors: Emery Schoenly, Salisbury, CT (US); Andras L. Ferenczi, Scottsdale, AZ (US); Ajay Babu Maddukuri, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 243 days.

(21) Appl. No.: 18/359,701

(22) Filed: Jul. 26, 2023

(65) Prior Publication Data

US 2025/0038990 A1    Jan. 30, 2025

(51) Int. Cl.
*H04L 29/06* (2006.01)
*H04L 9/32* (2006.01)

(52) U.S. Cl.
CPC .......... *H04L 9/3247* (2013.01); *H04L 9/3273* (2013.01)

(58) Field of Classification Search
CPC ....... H04L 9/32; H04L 9/3215; H04L 9/3247; H04L 9/3263; H04L 9/3273; H04L 63/0407; H04L 63/0414; H04L 63/0421; H04L 63/18
See application file for complete search history.

(56) References Cited

U.S. PATENT DOCUMENTS

| | | | | |
|---|---|---|---|---|
| 7,532,571 B1 * | 5/2009 | Price | ................... | H04L 43/0811 709/239 |
| 11,777,932 B1 * | 10/2023 | Kempf | .................... | H04L 63/20 726/4 |
| 2014/0321444 A1 * | 10/2014 | Klein | .................... | H04W 76/14 370/338 |
| 2016/0094388 A1 * | 3/2016 | Britt, Jr. | .............. | H04L 41/0816 370/254 |
| 2021/0328865 A1 * | 10/2021 | Lunt | ..................... | H04L 63/107 |
| 2021/0385216 A1 * | 12/2021 | Khalil | ....................... | H04L 9/50 |
| 2022/0067649 A1 * | 3/2022 | Choi | ................... | G06Q 10/0833 |
| 2022/0122170 A1 * | 4/2022 | Du | ........................ | H04L 9/0869 |

(Continued)

*Primary Examiner* — Malcolm Cribbs
(74) *Attorney, Agent, or Firm* — Thomas Horstemeyer, LLP

(57) ABSTRACT

Disclosed are various embodiments for offline decentralized identity-based communications between software applications. In one non-limiting example, a system can include a computing device that is configured to detect a network connection loss to a network and receive, via a local area network, a request for an action to be performed by a client device. The request includes a first digital signature of the client device and is associated with a decentralized identifier. The computing device is configured to generate a mutually signed request that includes a second digital signature executed by the computing device and the first digital signature. The mutually signed request is transmitted to the client device. A network connection to the network is detected. The decentralized identifier is validated using the network. The requested action is performed by the computing device based at least in part on the validation of the decentralized identifier.

20 Claims, 5 Drawing Sheets

(56) References Cited

U.S. PATENT DOCUMENTS

| | | | |
|---|---|---|---|
| 2023/0117628 A1* | 4/2023 | Giffard-Burley | G06F 16/93 707/736 |
| 2024/0056309 A1* | 2/2024 | He | H04L 9/3247 |
| 2024/0089130 A1* | 3/2024 | Wang | H04L 9/50 |

* cited by examiner

OFFLINE DECENTRALIZED IDENTITY-BASED COMMUNICATION FOR APPLICATIONS

BACKGROUND

Distributed ledger technology can be implemented and distributed across a network of servers, in which each server can be located in varying geographic locations. In some cases, distributed ledger technology is used for implementing decentralized identifiers on one or more layers of a network stack for an internet protocol. The transactions involving the decentralized identifiers can be updated on the distributed ledger using the internet protocol.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
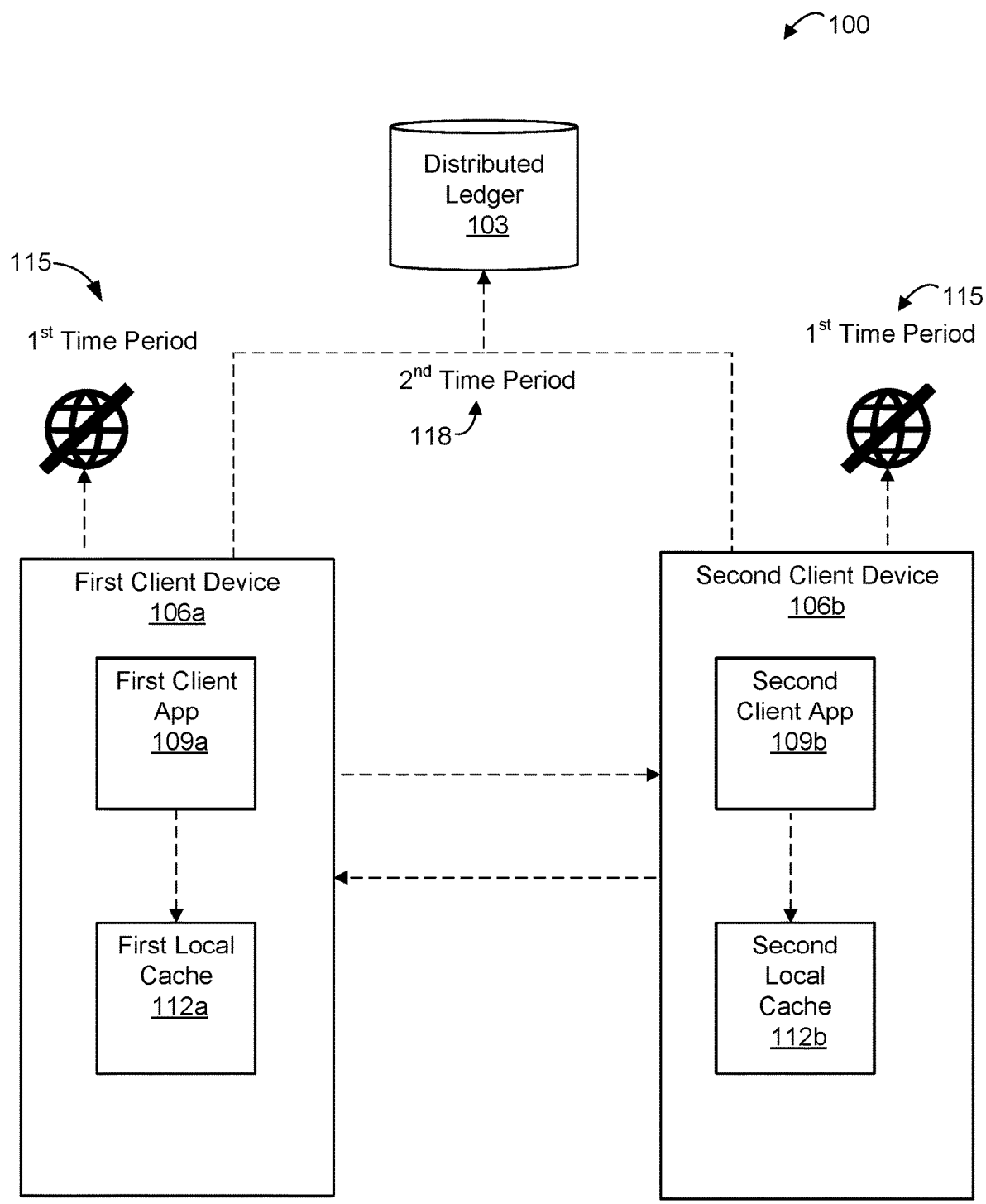
FIG. 1A is a drawing depicting client devices generating offline decentralized identifier-based communication according to various embodiments of the present disclosure.

Disclosed are various approaches for offline decentralized identity-based communications between software applications. In some scenarios, the offline decentralized identify-based communications is between software applications on separate devices. In other cases, the offline decentralized identify-based communications is between software applications executed on the same device.

Typically, computing entities can establish secure communication using decentralized identifiers (DIDs) between software applications when there is an internet connection. The software applications can use the DIDs in order to initiate secure communications over an internet protocol (e.g., Trust over Internet Protocol's Layer 2 Protocol or Layer 3). However, when an internet connection to a wide area network is not available, distributed ledger technology (e.g., a blockchain) cannot be updated regarding the transactions and/or communications between software applications.

Various embodiments of the present disclosure relate to systems and methods for enabling secure connections and communication between software applications without an internet connection. In some examples, the embodiments can implement secure communication by storing a record of offline communications or transactions between software applications. As a result, the software applications can enable secure transactions in scenarios where the software applications do not have internet coverage.

In addition, the embodiments are directed to improving the use of decentralized identifiers and/or decentralized identify-based messaging protocols in scenarios with no or intermittent internet access. For example, when there is a loss of a connection to a wide area network, the embodiments can include establishing a local area network between devices in order to generate an offline record of communications using the decentralized identifiers for one or more subjects (e.g., users, objects, devices, entities, etc.). Each device involved in the communication can locally store a copy of the offline record of communication.

Additionally, the offline communications and/or transactions are each digitally signed by each involved entity. Thus, the offline communication can be trusted because the entities involved each signed the offline communication with a cryptographic key. Thus, each transaction or communication can have two digital signatures to indicate that the entities involves authorized the transaction. Accordingly, when the internet connection is re-established, one or both of the software applications can update the distributed ledger by providing the offline transactions or communication to the distributed ledger. Thus, decentralized identifiers and decentralized identifier-based communication messaging protocols (e.g., DIDComm) can be used in more situations where there is no or intermittent internet connection. In some respects, DIDComm is a messaging protocol that provides secure, private communication protocol that incorporates the decentralized design of DIDs. Thus, two or more DID-controlling entities can create a secure communication channel between software applications of the DID-controlling entities, which can be representative of people, organization, or things. In some implementations, the secure communication is authenticated because the protocol involves mutual authentication with cryptographic keys (e.g., public-private key pairs) between the DID-controlling entities. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

As illustrated in FIG. 1A, shown is an illustration of a first scenario of a first network environment 100 of devices generating offline decentralized communication during a period of time with no internet connection. In the first scenario, the first network environment 100 includes a distributed ledger 103, a first client device 106a, a second client device 106b (collectively "the client devices 106" and generically as "a client device 106"), and other suitable devices, which can be in data communication via a wide are network.

The distributed ledger 103 can represent synchronized, eventually consistent, data stores spread across multiple nodes in different geographic or network locations. The distributed ledger 103 can maintain records of communications (e.g., transactions) between the client devices 106.

Each client device 106 can have a client application 109 (e.g., first client application 109a, second client application 109b, etc.), a local cache 112 (e.g., a first local cache 112a, a second local cache 112b, etc.), and other suitable components and data elements. Further, each client device 106 may each have a unique cryptographic key pair (e.g., a private key and a public key), a unique decentralized identifier (DID), and other suitable data elements. A DID can corresponds to an identifier that enables verifiable, decentralized digital identity of a subject (e.g., person, organization, thing, etc.). Examples of DIDs include identifiers or data structures that comply with the Decentralized Identifier (DID) standard published by the World Wide Web Consortium (W3C).

In this first scenario, a first user of the first client device 106a may desire an action to be performed by the second client device 106b. The second client device 106b may to need to validate the first user's identity and credentials before the second client device 106b performs the requested action. Some non-limiting examples of an action can include issuing a verifiable credential, authorizing a purchase transaction, granting access to a physical restricted area (e.g., granting access to a concert area or a secure area), granting access to restricted data and/or software applications, and other suitable actions that require validation.

For instance, the first user of the first client device 106a may desire a verifiable credential (e.g., an access credential) for accessing a restricted venue area (e.g., a concert area). The first user may have already purchased a ticket and the first user needs to obtain the verifiable credential from the second client device 106b at the venue location.

At the venue location, the first client device 106a of the first user can exchange public keys with a second client device 106b while connected to a wide area network. In this example, the second client device 106b can be used by personnel at the concert venue to issue verifiable credentials for concert attendees to access the concert venue area. The first client device 106a can also provide personal information, such as a payment instrument, a purchase confirmation, and other suitable information.

Subsequently, the client device 106 may lose an internet connection for a first time period 115. The loss of internet connection may be the result of the concert venue being in a remote location, radio interference from nearby structures (e.g., trees, mountains, etc.), inside of an indoor facility that has radio interference materials, (e.g., certain building materials for the roof, walls, etc.), weather conditions, or other suitable conditions. As such, the client devices 106 are no longer in data communication with the distributed ledger 103. Previously, the lack of internet connectivity would have halted further decentralized identity-based communication between the client devices 106.

In this scenario, the first client device 106a and/or the second client device 106b can detect the lack of internet connection to a wide area network. The first client device 106a can proceed with requesting a verifiable credential (e.g., an access credential) by establishing a data communication channel via alternative communication methods. For example, the first client device 106a can establish data communication with the second client device 106b via a local area network, such as via near field communication (NFC), Bluetooth®, Zigbee®, WIFI®, and other suitable local area networks. In some instances, the first client device 106a can have a communication address for the second client device 106b for each communication method for initiating the data communication channel as a local area network.

Through the local area network, the first client application 109a can send a request for an insurance of a verifiable credential to the second client device 106b. Prior to sending the request, the first client application 109a can sign the request with a first private key for the first client device 106a. Additionally, the request can include a decentralized identifier (DID) for the first user, a DID document, supporting data (e.g., payment confirmation, payment instrument identifier, transaction information, etc.), and other suitable data.

Upon receiving the signed request, the second client application 109b can also sign the signed request with a second private key of the second client device 106b. In some instances, the second client application 109b can verify the digital signature of the first client device 106a by using a first public key that was provided by the first client device 106a. In the event the digital signature is valid, the second client application 109b can proceed to sign the request as well. By signing the request as well, the second client application 109b can generate a mutually signed request. The mutually signed request can represent an offline transaction that has been digitally signed by the first client device 106a and the second client device 106b. The second client application 109b can store the mutually signed request in the second local cache 112b. In some instances, the mutually signed request can be store in a local ledger data structure (e.g., as a list of offline transactions), a Merkle tree (e.g., a hash tree) data structure, and other suitable data structures.

Next, the second client application 109b can transmit the mutually signed request to the first client application 109a. The first client application 109a can store the mutually signed request in the first local cache 112a, similar to the storage performed in the second local cache 112b. Afterwards, the second client application 109b can transmit an acknowledgement of recording the mutually signed request to the second client application 109b. In response, the second client application 109b can transmit an acknowledgement of recording receipt to the first client application 109a. Accordingly, each client device 106 has a copy of the mutually signed request. As a result, the mutually signed request cannot be disputed by either party.

Subsequently, the client devices 106 can detect an internet connection during a second time period 118. As such, the client devices 106 can be in data communication with the distributed ledger 103. As a result, the mutually signed requests (e.g., the offline transaction) can be reconciled and/or updated in the distributed ledger 103.

In some examples, upon detecting an internet connection, the second client application 109b can validate an identity and a credential of the first user. For instance, continuing with the concert example, the second client application 109b can validate the first user's identity and transaction information with an associated computing server (e.g., a ticketing server) that provided the purchase confirmation to the first client device 106a.

After the validating the first user's identity and credential, the second client application 109a can issue a verifiable credential (e.g., an access credential) for the DID associated with the first client device 106a. The verifiable credential can be stored in the distributed ledger 103. Then, the second client application 109b can transmit the issued verifiable credential to the first client application 109a. The second client application 109b can use one or more communication methods for sending the issued verifiable credential, such as a wide area network connection or a local area network connection.

In the event the second client application 109b fails to issue a verifiable credential, the second client application 109b can transmit a message to the first client application 109a indicating the failure. The message can include a method for remedying the error.

Figure 1B:
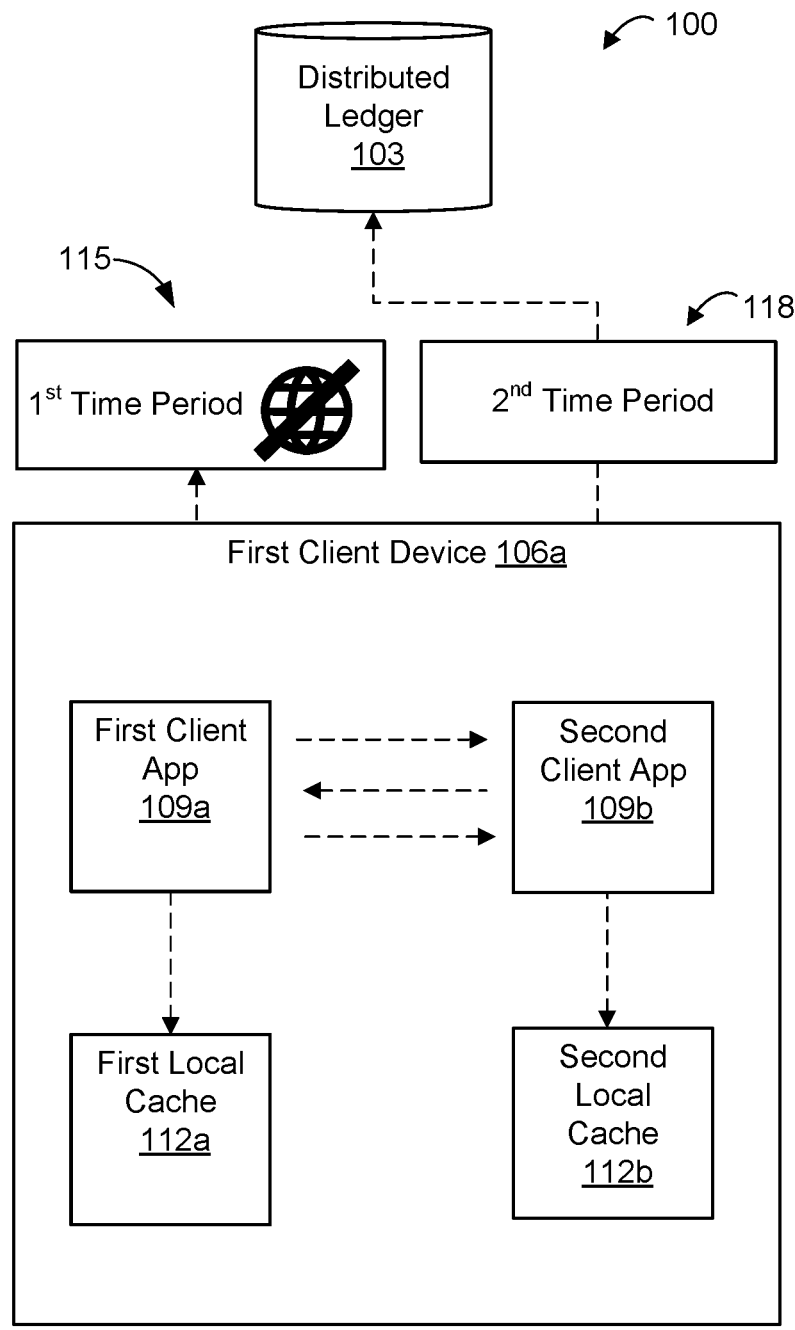
FIG. 1B is a drawing depicting applications on a client device generating offline decentralized identifier-based communication according to various embodiments of the present disclosure.

Next, FIG. 1B illustrates a second scenario of the first network environment 100 of two applications generating offline decentralized communication on a single client device 106 during a period of time with no internet connection during a first time period 115. In this second scenario, the first client device 106 includes the first client application 109a and the second client application 109b instead of each application being located on separate client device as in FIG. 1A. Additionally, the first client device 106a includes a first local cache 112a for the first client application 109a and a second local cache 112b for the second client application 109b.

In the event of a loss of internet connection, the first client application 109a and the second client application 109b can execute a similar workflow for generating offline decentralized identifier-based communication as described with regard to FIG. 1A. For example, the first client application 109a can be a healthcare application that maintains the healthcare records of the user. Some of the healthcare record can include a history of vaccines taken, a history healthcare testing results, and other suitable healthcare records. The second client application 109b can be associated with admitting attendees at a concert venue location. In order to get a verifiable credential for admission to the concert venue, the second client application 109b can be tasked with validating healthcare testing results of the user. The user may have to provide evidence of test results that indicate the user has tested negative within a recent time window for one or more potential contagious diseases prior to a concert date.

Similar to the FIG. 1A, the first client application 109a may need to request a verifiable credential (e.g., an access credential) for accessing a restricted venue area (e.g., a concert area) from the second client application 109b. Prior to arriving at the venue location, the first client application 109a and the second client application 109b can exchange public keys in a situation in which each client application 109 has a unique public-private key pair.

At the venue location, the first client device 106 can detect a lack of an internet connection for a first time period 115. The first client application 109a may desire to request a verifiable credential (e.g., an access credential) from the second client application 109b. Since the first client device 106a lack access to a wide area network, the second client application 109b cannot validate data associated with the request from remote computing devices or the distributed ledger 103. Instead, the first client application 109a and the second client application 109b can generate offline decentralized identifier-based communication for the first time period 115.

Accordingly, the first client application 109a can generate a request for an issuance of a verifiable credential and sign the request with a first private key of the first client application 109a. Additionally, the request can include a DID for the first user, a DID document, supporting data (e.g., healthcare record number, testing certification record, transaction information, etc.), and other suitable data. The first client application 109a send the request for the verifiable credential to the second client application 109b.

Upon receiving the signed request, the second client application 109b can also sign the signed request with a second private key of the second client application 109b. In some instances, the second client application 109b can verify the digital signature of the first client device 106a by using the first public key that was provided by the first client application 109a. In the event the digital signature is valid, the second client application 109b can proceed to sign the request as well. By signing the request as well, the second client application 109b can generate a mutually signed request. The mutually signed request can represent an offline transaction that has been digitally signed by the first client application 109a and the second client application 109b. The second client application 109b can store the mutually signed request in the second local cache 112b similar to the methods described for FIG. 1A.

Next, the second client application 109b can transmit the mutually signed request to the first client application 109a. The first client application 109a can store the mutually signed request in the first local cache 112a, similar to the storage performed in the second local cache 112b. Afterwards, the second client application 109b can transmit an acknowledgement of recording the mutually signed request to the second client application 109b. In response, the second client application 109b can transmit an acknowledgement of recording receipt to the first client application 109a.

Subsequently, the first client device 106a can detect an internet connection during a second time period 118. As such, the first client device 106a can be in data communication with the distributed ledger 103. As a result, the mutually signed requests (e.g., the offline transaction) can be reconciled and/or updated in the distributed ledger 103.

In some examples, upon detecting an internet connection, the second client application 109b can validate an identity and credentials of the user provided by the first client application 109a. For instance, continuing with the concert example, the second client application 109b can validate the first user's identity and healthcare records with an associated server (e.g., a healthcare server) that provided the healthcare records/certifications to the first client application 109a.

After the validating the user's identity and credentials, the first client application 109a can issue a verifiable credential (e.g., an access credential) for the first client application 109a. The verifiable credential can be stored in the distributed ledger 103. Then, the second client application 109b can transmit the issued verifiable credential to the first client application 109a. In the event the second client application 109b fails to issue a verifiable credential, the second client application 109b can transmit a message to the first client application 109a indicating the failure. The message can include a method for remedying the error.

Figure 2:
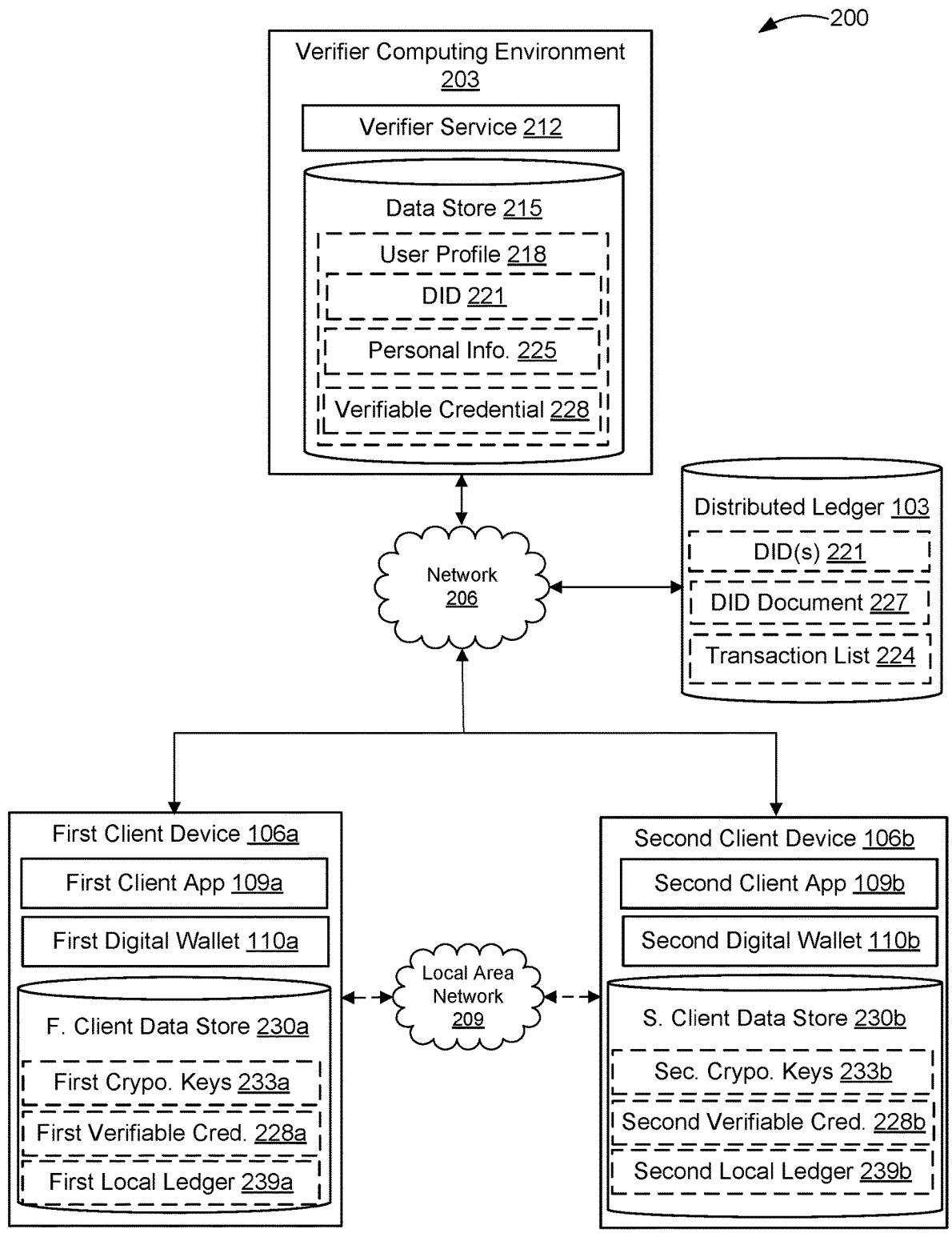
FIG. 2 is a drawing of a network environment according to various embodiments of the present disclosure.

With reference to FIG. 2, shown is a second network environment 200 according to various embodiments. The second network environment 200 can include a distributed ledger 103, a first client device 106a, a second client device 106b, and a verifier computing environment 203, which can be in data communication with each other via a network 206.

The network 206 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

The first client device 106a and the second client device 106b (collectively "the client devices 106" and generically as "a client device 106") can be in data communication via a local area network 209. The local area network 209 can represent a data communication channel between two client devices 106 and the data communication channel does not rely on the network 206. In some instances, the local area network 209 can be a data interconnection between devices within a limited geographic area. Some non-limiting examples of the local area network 209 can include Personal area network (PAN), near field communication (NFC), Bluetooth®, Zigbee®, WIFI®, and other suitable local area networks 209.

The verifier computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the verifier computing environment 203 can employ a plurality of computing devices that can be arranged in one or more server banks or computer banks or other arrangements. Such computing devices can be located in a single installation or can be distributed among many different geographical locations. For example, the verifier computing environment 203 can include a plurality of computing devices that together can include a hosted computing resource, a grid computing resource or any other distributed computing arrangement. In some cases, the verifier computing environment 203 can correspond to an elastic computing resource where the allotted capacity of processing, network, storage, or other computing-related resources can vary over time.

Various applications or other functionality can be executed in the verifier computing environment 203. The components executed on the verifier computing environment 203 include a verifier service 212, and other applications, services, processes, systems, engines, or functionality not discussed in detail herein.

The verifier service 212 can be executed to facilitate with validation of identifies and/or credentials provided by the client devices 106 in association with decentralized identifier-based communication.

Also, various data is stored in a data store 215 that is accessible to the verifier computing environment 203. The data store 215 can be representative of a plurality of data stores 215, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 215 is associated with the operation of the various applications or functional entities described below. This data can include user profile 218, and potentially other data.

The user profile 218 can represent user data stored in association with a service of the verifier computing environment 203. The user profile 218 can include a decentralized identifier (DID) 221, personal information 225, verifiable credentials 228, and other suitable data associated with the user.

The DID 221 can correspond to an identifier that enables verifiable, decentralized digital identity of a subject (e.g., person, organization, thing, etc.). In some examples, the DID 121 can be used to represent the identity of a user, a client device 106, and other suitable subjects. In various examples, a DID 121 can correspond to an address to a DID document 227 that includes information associated with the subject (e.g., a user, a client device 106, etc.). In various examples, the DID 121 can be implemented using various standards, such as a version of the World Wide Web Consortium's (W3C's) Decentralized Identifier (DID) standard.

The personal information 225 can represent personal data associated with a user, name, address, contact information, transaction information (e.g., transaction confirmation, payment instruments, etc.), healthcare information, and other suitable user data. The verifiable credential 228 can represent a digital credential that has been issued by a third party, such as the verifier computing environment 203 and/or a client device 106.

The distributed ledger 103 can represent synchronized, eventually consistent, data stores spread across multiple nodes in different geographic or network locations. Each node in the distributed ledger 103 can contain a replicated copy of the distributed ledger 103, including all data stored in the distributed ledger 103. Records of transactions involving the distributed ledger 103 can be shared or replicated using a peer-to-peer network connecting the individual nodes that form the distributed ledger 103. Once a transaction or record is recorded in the distributed ledger 103, it can be replicated across the peer-to-peer network until the record is eventually recorded with all nodes.

The distributed ledger 103 can include DID(s) 221, a transaction list 224, a DID document 227, and other suitable data. In various examples, a DID 121 can correspond to an address to a DID document 124 that includes information associated with the subject (e.g., user). For example, the DID document 227 can comprise include a set of data describing the subject and can include various information (e.g., cryptographic keys) that can used to authenticate the subject. In various examples, the DID document 227 can include an address or pathway for accessing a wallet service associated with a user. In various examples, the DID 221, the DID document 227, and the transaction lists 224 can be implemented using various standards, such as the World Wide Web Consortium's (W3C's) Decentralized Identifier (DID) standard.

The transaction list 224 can represent transaction data associated with a service of the verifier computing environment. The transaction data can be associated with the tasks of users, organizations, devices, and other suitable entities. Some non-limiting examples of data in the transaction list 224 can include the issued verifiable credentials 228, purchase transaction information, user access information, and other suitable data.

The first client device 106a and the second client device 106b (collectively "the client devices 106" and generically as "a client device 106") can be representative of a plurality of client devices that can be coupled to the network 206 and/or the local area network 209. The client devices 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, tablet computer systems, music players, portable game consoles, electronic book readers, and similar devices), media playback devices (e.g., media streaming devices, set-top boxes, and similar devices), a videogame console, or other devices with like capability. The client devices 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client devices 106 or can be connected to the client devices 106 through a wired or wireless connection.

The client devices 106 can be configured to execute various applications such as client applications 109 (e.g., a first client application 109a, a second client application 109b, etc.), digital wallets 110 (e.g., a first digital wallet 110a, a second digital wallet 110b, etc.), or other applications. The client applications 109 can be executed in the client devices 106 to access network content served up by the verifier computing environment 203 or other servers, thereby rendering a user interface on the display. The client applications 109 can be executed to request an action or execute an action. The client application 109 can be executed to execute offline decentralized identifier-based communications with another client application 109, which can be executed on the same client device 106 or another client device 106.

Further, the client applications 109 can include a browser, a dedicated application, or other executable, and the user interface can include a network page, an application screen, or other user mechanism for obtaining user input. The client devices 106 can be configured to execute applications beyond the client applications 109 such as email applications, social networking applications, word processors, spreadsheets, or other applications. The digital wallet 110 can be executed to communicate with other digital wallets 110, the verifier computing environment 203, the distributed ledger 103, other client devices 106, and other suitable computing systems. In various examples, the digital wallet service 110 can be executed to generate DID data for decentralized identifiers (DIDS) 221 and/or the DID Documents 227. In various examples, the digital wallet service 110 can store verifiable credentials 238 associated with a particular user and issued by a trusted third party in the client data store 230.

Also, various data is stored in a first client data store 230a and a second client data store 230b (collectively "the client data stores 230" and generically as "a client data store 230") that is accessible to the client devices 106. The client data stores 230 can be representative of a plurality of client data stores 230, which can include local caches (FIGS. 1A and 1B), relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the client data store 230 is associated with the operation of the various applications or functional entities described below. This data can include user cryptographic keys 233 (e.g., first cryptographic keys 233a, second cryptographic keys 233b, etc.), verifiable credential 228 (e.g., first verifiable credential 228a, second verifiable credential 228b, etc.), local ledger 239 (e.g., first local ledger 239a, second local ledger 239b, etc.), and potentially other data.

The cryptographic keys 233 can represent a public key and a private key pair. Each client device 106 can have a unique cryptographic key pair. In some embodiments, each client application 109 can have a unique cryptographic key pair. The private key can be used to sign a request for a verifiable credential, to sign a request for another client device 106 to perform an action, and other suitable requests. The public key can be used to validate a digital signature included on a request, a message, or other suitable data received from another device.

The verifiable credential 236 can represent a digital credential used to identify an attribute (e.g., qualification, component, authority, achievement, personally quality, etc.) associated with a credential holder (e.g., a user of a client device 106, etc.). The local ledger 239 can represent a list, a data structure, a Merkel tree (i.e., hash tree) data structure, and other suitable data structures. The local ledger 239 can store data related to offline decentralized identifier-based communication between multiple client devices 106, multiple client applications 109, and other suitable entities. The offline decentralized identifier-based communication can include offline transactions between at least two entities, such as e.g., mutually signed requests, mutually signed transactions, and other suitable transactions.

Next, a general description of the operation of the various components of the second network environment 200 is provided. To begin, the client devices 106 can exchange public keys with each other through the network 206 (e.g., a wide area network connection). For example, the first client device 106a can transmit a first public key and personal information to the second client device 106b. The second client device 106b can transmit an acknowledgement receipt of the first public key and a second public key associated with the second client device 106b.

Subsequently, the first client device 106a can detect a loss of an internet connection. In response, the first client device 106a can establish a data communication channel with the second client device 106 through the local area network 209. Through the local area network, the first client application 109a can send a request for the verifiable credential to the second client device 106b. Prior to sending the request, the client application 109a can sign the request with a first private key for the first client device 106a. Additionally, the request can include a decentralized identifier (DID) 221 for the first user, a DID document 227, supporting data (e.g., payment confirmation, payment instrument identifier, transaction information, etc.), and other suitable data.

Upon receiving the signed request, the second client application 109b can also sign the signed request with a second private key of the second client device 106b. In some instances, the second client application 109b can verify the digital signature of the first client device 106a by using a first public key that was provided by the first client device 106a. In the event the digital signature is valid, the second client application 109b can proceed to sign the request as well. By signing the request as well, the second client application 109b can generate a mutually signed request. The second client application 109b can store the mutually signed request in the second local ledger 239b. The mutually signed request can be stored as a list of offline transactions.

Next, the second client application 109b can transmit the mutually signed request to the first client application 109a. The first client application 109a can store the mutually signed request in the first local ledger 239a, similar to the storage performed in the second local ledger 239b.

At subsequent point in time, the first client device 106a and/or the second client device 106b can detect an internet connection via the network 206. In some examples, upon detecting an internet connection, the second client application 109b can validate an identity and/or a credential of the first user associated with the first client application 109a. For instance, the second client application 109b can validate the first user's identity and personal information with the verifier service 212.

After the validating the first user's identity, the first client application 109a can issue a verifiable credential 236 for the first client device 106a. The verifiable credential 236 can be stored in the distributed ledger 103. Then, the second client application 109b can transmit the issued verifiable credential 236 to the first client application 109a. The second client application 109b can use one or more communication methods for sending the issued verifiable credential, such as a wide area network connection or a local area network connection. For example, the second client device 106b can initiate a decentralized identifier communication (DID-Comm) connection with the first client application 109a. The first client application can transmit the issued verifiable credential 236 and a DID document 227 associated with the issued verifiable credential 236 through the DIDComm connection. In some instances, the second client application 109b may select to the use the DIDComm data communication channel because of the protocol offers improved security over other data communication channels. However, the second client application 109b can select an alternative data communication channel in other scenarios based on the application conditions (e.g., speed requirements, data requirements, etc.).

In the event the second client application 109b fails to issue a verifiable credential 236, the second client application 109b can transmit a message to the first client application 109a indicating the failure. The message can include a method for remedying the error.

Figure 3:
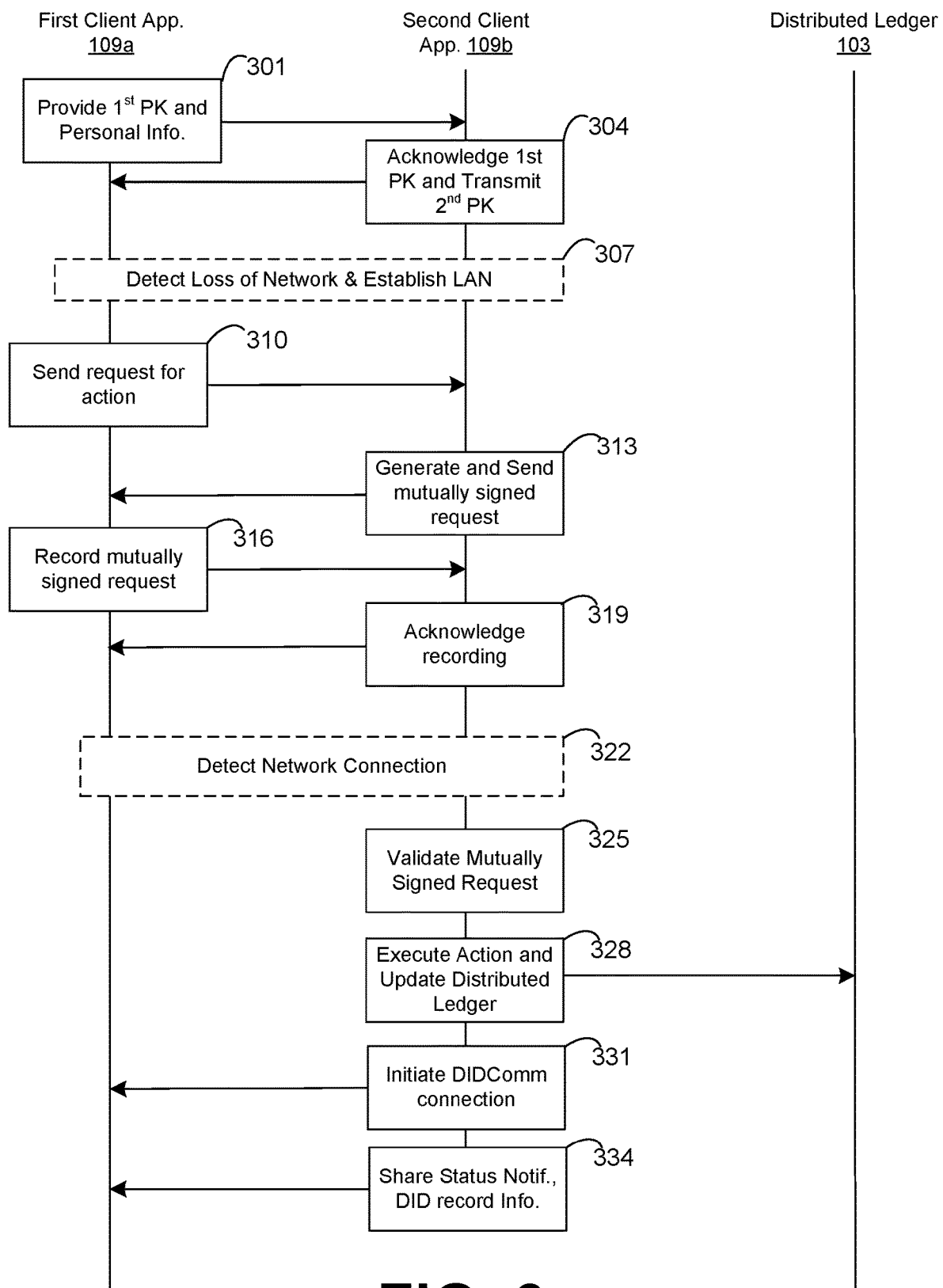
FIG. 3 is a sequence diagram illustrating functionality implemented by components of the network environment of FIG. 2 according to various embodiments of the present disclosure.

Referring next to FIG. 3, shown is sequence diagram illustrating functionality implemented in the second network environment 200. The sequence diagram of FIG. 3 provides merely an example of the many different types of functional arrangements that can be employed to implement the operation of the of the second networked environment 200. As an alternative, the sequence diagram of FIG. 3 can be viewed as depicting an example of elements of a method implemented within the second network environment 200.

In block 301, the first client application 109a can transmit a first public key and personal information of a user to the second client application 109b. The first public key can be associated with the first client application 109a and/or the first client device 106a. The personal information can include an email address, name, address, a DID 121, contact information, and other suitable data. In some examples, the first client application 109a can transmit one or more communication addresses (e.g., Bluetooth®, NFC, WIFI, PAN, etc.) for the first client device 106a in the event of a loss of a connection to the network 206.

In block 304, the second client application 109b can receive the first public key and transmit an acknowledgement to the first client application 109a. The second client application 109b can transmit a second public key to the first client application 109a. The second public key can be associated with the second client application 109b and/or the second client device 106b. In some examples, the second client application 109b can transmit one or more communication addresses (e.g., Bluetooth®, NFC, WIFI, PAN, etc.) for the second client device 106b in the event of a loss of the network 206.

In block 307, the second client application 109b and/or the first client application 109a can detect a loss of a connection to the network 206. In response, the client applications 109 can establish a data communication channel via the local area network 209. For example, the first client application 109a can initiate a LAN communication channel in response to detecting a loss of a connection to the network 206. The first client application 109a can select a communication address from a list of communication addresses for the second client application 109b. Accordingly, the selected communication address can be used to initiate the LAN communication channel.

In block 310, the first client application 109a can transmit to the second client application 109b a request of an action to be performed by the second client application 109b. The first client application 109a can generate the request by generating a first digital signature using a first private key of the first client application 109a. The request can include a DID 221 associated with the user of the first client device 109a.

In block 313, the second client application 109b can generate a mutually signed request by creating a second digital signature using a second private key. In some instances, the second client application 109b can validate the first digital signature using the first public key prior to creating the second digital signature. The mutually signed request can be stored in the second client data store 230b. The mutually signed request can be transmitted to the first client application 109a through the local area network 209.

In block 316, the first client application 109a can record or store the mutually signed request in the first client data store 230a. As such, both client devices 106 have a copy of the mutually signed request. The mutually signed request can be stored as a transaction in a list of offline transactions for the offline time period (e.g., the first time period 115 illustrated in FIG. 1A and FIG. 1B). The first client application 109a can transmit a notification of storing the mutually signed request to the second client application 109b.

In block 319, the second client application 109b can receive the notification and transmit an acknowledgement for receiving the notification. In some embodiments, the second client application 109b can repeat blocks 310-319 with other client applications 109 from other client devices 106. As a result, the second client data store 230b can accumulate a list of offline transactions (e.g., mutually signed requests) during a period of time with no internet connection to the network 206. In some embodiments, block 319 can be omitted.

In block 322, the first client application 109a and/or the second client application 109b can detect a connection to the network 206. The client applications 109 can detect a connection to the network 206 based on multiple attempts over a periodic time interval to access a remote computing device. In some examples, the second client application 109b can receive a notification from the first client application 109a to re-attempt a connection to the network 206 because the first client application 109a has already re-established a connection to the network 206.

In some examples, the first client application 109a can re-establish a connection to the network 206 before the second client application 109b can re-establishing a connection to the network 206. In these situations, the first client application 109a can notify, via the local area network 209, the second client application 109b of the network connection in order to command or request the second client application 109b to attempt to re-establish a connection with the network 206.

In block 325, the second client application 109b can validate the mutually signed request by verifying the DID 121 or user identifier of the first client application 109a with a verifier computing environment 203. In some instances, the second client application 109b can transmit the DID 121

(or a user identifier) and a credential to the verifier computing environment 203 for the validation process.

In block 328, the second client application 109*b* can execute the requested action after the validation of the mutually signed request. For example, the requested action can include issuing a verifiable credential for the user of the first client application 109*a*. In other instances, the requested action can include executing a purchase transaction. After the requested action has been performed, the second client application 109*b* can update the distributed ledger 103, in which the update can include a DID 121 or a user identifier and data associated with the requested action (e.g., the verifiable credential, purchase confirmation, confirmation information, etc.).

In block 331, the second client application 109*b* can select a data communication channel for communicating with the first client application 109*a* based one or more context conditions. Some non-limiting examples of context conditions a security requirement, a data limitation, a speed requirement, and other suitable context conditions. In one non-limiting example, the second client application 109*b* can initiate a DIDComm data communication channel with the first client application 109*a* after the distributed ledger 103 has been updated.

In block 334, the second client application 109*b* can transmit a status update through the established data communication channel (e.g., the DIDComm channel). Alternatively, the second client application 109*b* can use a different communication channel other than a DIDComm channel. Then, the timing sequence can proceed to the end.

Figure 4:
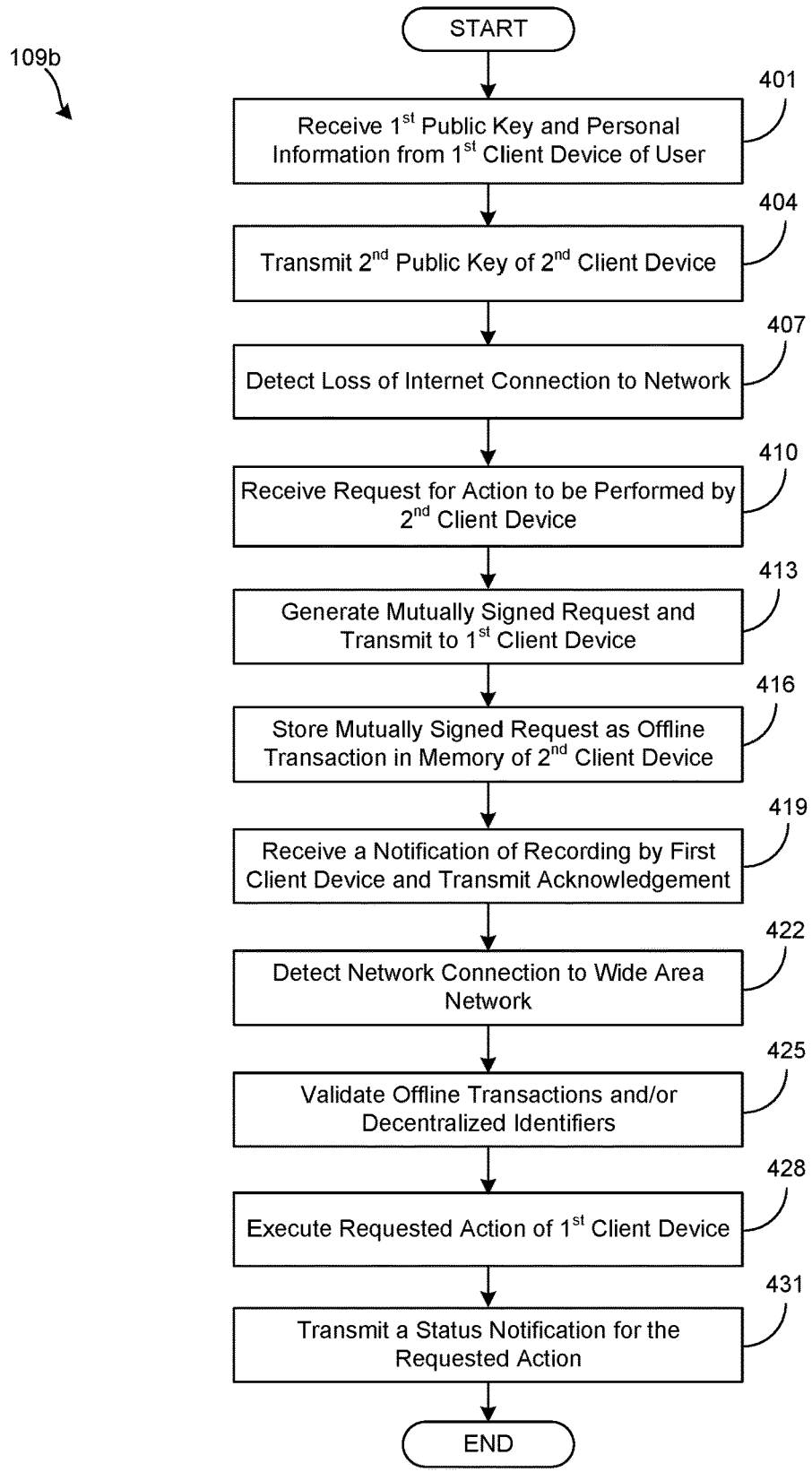
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of the second client application 109*b*. The flowchart of FIG. 4 provides merely an example of the many different types of functional arrangements that can be employed to implement the operation of the depicted portion of the second client application 109*b*. Additionally, the flowchart of FIG. 4 can be implemented by the first client application 109*a*. As an alternative, the flowchart of FIG. 4 can be viewed as depicting an example of elements of a method implemented within the second network environment 200.

Beginning with block 401, the second client application 109*b* can receive a first public key and personal information from the first client application 109*a* of the first client device 106*a* of a user. The first public key can be used for validating digital signatures in ensure that the messages and/or request are from the first client device 106*a*. The personal information can include name, contact information (e.g., an email address, a phone number, etc.), a device identifier (internet protocol address, device serial number, etc.), and other suitable information. The personal information can also include communication addresses for establishing a data communication channel via a local area network 209.

In block 404, the second client application 109*b* can transmit a second public key of the second client device 106*b* to the first client application 109*a*. In some examples, the second client application 109*b* can transmit an acknowledgement receipt to the first client application 109*a* for receiving the first public key from the first client device 106*a*.

In block 407, the second client application 109*b* can detect a loss of an internet connection to the network 206 (e.g., a wide area network). In response to the loss of the internet connection, the second client application 109*b* (and/or the first client application 109*a*) can establish a data communication channel via the local area network 209. In some instances, the second client application 109*b* can try to establish the data communication via one or more communication channels (e.g., Bluetooth®, WIFI, NFC, Zigbee, etc.) using a list of communication addresses for the first client device 106*a*. For example, the second client application 109 can attempt to establish data communication channel via a first LAN communication channel. In the event that the first LAN communication channel fails to be established, the second client application 109*b* can attempt to establish a second LAN communication channel. In some examples, the first client application 109*a* can initiate an LAN communication channel and the second client application 109*b* can accept the LAN communication channel.

In block 410, the second client application 109*b* can receive a request for an action from the first client application 109*a*. Some non-limiting examples of a request for action can include issuing a verifiable credential, granting access to a restricted area, processing a purchase transaction, and other suitable action. The received request can be signed (e.g., a digital signature) by the first client application 109*a*. In some instances, the received request can be validated by validating the digital signature. The first public key associated with the first client application 109*a* can be used to validate the digital signature.

Additionally, the request can include supporting data, a DID document 227, a DID 221, and other suitable data. The supporting data can include data related to the requested action. For example, the supporting data can include confirmation information, purchase confirmation information, name, address, email address, user identifier, health record information, and other suitable information.

In block 413, the second client application 109*b* can generate a mutually signed request. The mutually signed request can be generated by the second client application 109*b* signing the request with a second private key for the second client application 109*b* or the second client device 106*b*. As such, the mutually signed request includes the first digital signature from the first client application 109*a* and the second digital signature from the second client application 109*b*. In some instances, the mutually signed request can represent an offline transaction.

In block 416, the second client application 109*b* can store the mutually signed request (e.g., offline transaction) in the second client data store 230*b*. The mutually signed request can be stored in a data structure. For example, the mutually signed request can be stored in an offline transaction list, a Merkle tree data structure, and other suitable data structure.

In block 419, the second client application 109*b* can receive a notification of a recording (e.g., storage) of the mutually signed requested from the first client application 109*a*. In response, the second client application 109*b* can transmit an acknowledgement of the notification to the first client application 109*a*.

In block 422, the second client application 109*b* can detect a network connection to the network 206. In some examples, the second client application 109*b* can detect the network connection by attempting on a periodic time interval to re-establishing a network connection to the network 206. In other examples, the second client application 109*b* can attempt to re-establish a network connection based at least in part on a receive a connectivity request from the first client application 109*a*. The connectivity request can indicate that the first client application 109*a* has a connection to the network 206.

In block 425, the second client application 109*b* can validate the mutually signed requested (e.g., the offline transaction) stored in the client data store 230*b*. In some examples, the second client application 109*b* can identify a DID 121 or other user identifier from the mutually signed request. Then, the second client application 109b can validate the DID 121 or the other user identifier with the verifier service 212. In some examples, the validation can include verifying the DID 121 (or the other user identifier) and a credential, in which the credential can be provided in the supporting data and/or the DID document 227.

In block 428, the second client application 109b can execute the requested action of the first client device 106a after the DID 121 (user identifier) has been validated with the verifier service. For example, the requested action can include issuing a verifiable credential to the distributed ledger 103, granting access to a restricted area, processing a purchase transaction, and other suitable action.

In block 431, the second client application 109b can transmit a status notification to the first client application 109a. The status notification can include an update for the requested action. For example, the status notification can include notifying of the issue verifiable credentials, notifying of a completed purchase by including a purchase confirmation, notifying of a grant of access to a restricted area, and other suitable notification.

In some instances, the second client application 109b can transmit the status notification through a particular communication channel that has been selected by the second client application based at least in part on one or more context conditions. For example, the second client application 109b can initiate a secure DIDComm connection through the network 206 based at least in part on a context condition relating to a data security requirement of the second client application 109b. Through the DIDComm connection, the second client application 109b can transmit the status notification (e.g., verifiable credential, purchase confirmation, notification of granted access, etc.). In the event the particular communication channel fails, the second client application 109b can establish an alternative communication channel. Then, the second client application 109b can proceed to the end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 3 and the flowchart of FIG. 4 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagram of FIG. 3 and the flowchart of FIG. 4 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagram of FIG. 3 and the flowchart of FIG. 4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same verifier computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
      detect a network connection loss for the computing device to a wide area network;
      receive, via a local area network, a request for a verifiable credential for a decentralized identifier from a client device, the request comprising a first digital signature of the client device;
      generate a mutually signed request that includes a second digital signature executed by the computing device and the first digital signature of the client device;
      transmit, via the local area network, the mutually signed request to the client device;
      detect a network connection to the wide area network;
      validate the decentralized identifier using the wide area network based at least in part on the mutually signed request; and
      generate the verifiable credential for the decentralized identifier based at least in part on the validation of the decentralized identifier.

2. The system of claim 1, wherein the machine-readable instructions, when executed by the processor, cause the computing device to at least:
   in an instance prior to the detection of the network connection loss, receive a first public key and personal identifying data of a user associated with the client device; and
   transmit a second public key of the computing device to the client device in response to the receiving the first public key.

3. The system of claim 2, wherein the machine-readable instructions, when executed by the processor, cause the computing device to at least:
   transmit a receipt acknowledgement in response to receiving the first public key of the client device.

4. The system of claim 1, wherein the machine-readable instructions, when executed by the processor, cause the computing device to at least:
   store the verifiable credential at a distributed ledger using the wide area network.

5. The system of claim 1, wherein the generation of the mutually signed request further causes the computing device to at least:
   store the mutually signed request in a Merkle tree data structure in the memory of the computing device.

6. The system of claim 1, wherein the generation of the mutually signed request further causes the computing device to at least:
   initiate a decentralized identifier communication (DIDComm) connection with the client device using the wide area network; and
   transmit the verifiable credential to the client device in a DIDComm message via the DIDComm connection.

7. The system of claim 1, wherein the request for the verifiable credential comprises a decentralized identifier (DID) document, the DID document comprising a first public key and the decentralized identifier.

8. A method, comprising:
   receiving, by a computing device, a request for an action for a decentralized identifier from a client device, the requesting comprising a first digital signature of the client device;
   detecting, by the computing device, a network connection loss for the computing device to a wide area network;

generating, by the computing device, an offline transaction that includes a second digital signature executed by the computing device and the first digital signature of the client device, the offline transaction representing a mutually signed request;

transmitting, by the computing device via a local area network, the offline transaction to the client device;

detecting, by the computing device, a network connection to the wide area network;

validating, by the computing device, the decentralized identifier using the wide area network based at least in part on the mutually signed request; and executing, by the computing device, the action for the decentralized identifier based at least in part on the validation of the decentralized identifier.

9. The method of claim 8, further comprising:
in an instance prior to the detection of the network connection loss, receiving, by the computing device, a first public key and personal identifying data of a user associated with the client device; and
transmitting, by the computing device, a second public key of the computing device to the client device in response to the receiving the first public key.

10. The method of claim 9, further comprising:
transmitting, by the computing device, a receipt acknowledgement in response to receiving the first public key of the client device.

11. The method of claim 8, further comprising:
storing, by the computing device, the verifiable credential at a distributed ledger using the wide area network.

12. The method of claim 8, wherein generating the mutually signed request further comprising:
storing, by the computing device, the mutually signed request in a Merkle tree data structure in the memory of the computing device.

13. The method of claim 8, further comprising:
initiating, by the computing device, a decentralized identifier communication (DIDComm) connection with the client device using the wide area network; and
transmitting, by the computing device, the verifiable credential to the client device in a DIDComm message via the DIDComm connection.

14. The method of claim 8, wherein the request for the verifiable credential comprises a decentralized identifier (DID) document, the DID document comprising a first public key and the decentralized identifier.

15. A non-transitory, computer-readable medium, comprising machine-readable instructions that, when executed by a processor of a computing device, cause the computing device to at least:
receive a request for an action for a decentralized identifier from a client device, the requesting comprising a first digital signature of the client device;
detect a network connection loss for the computing device to a wide area network;
generate a mutually signed request that includes a second digital signature executed by the computing device and the first digital signature of the client device;
transmit, via a local area network, the mutually signed request to the client device;
detect a network connection to the wide area network;
validate the decentralized identifier using the wide area network based at least in part on the mutually signed request; and
execute the action for the decentralized identifier based at least in part on the validation of the decentralized identifier.

16. The non-transitory, computer-readable medium of claim 15, wherein the machine-readable instructions, when executed by the processor, cause the computing device to at least:
in an instance prior to detecting the network connection loss, receive a first public key and personal identifying data of a user associated with the client device; and
transmit a second public key of the computing device to the client device in response to the receiving the first public key.

17. The non-transitory, computer-readable medium of claim 16, wherein the machine-readable instructions, when executed by the processor, cause the computing device to at least:
transmit a receipt acknowledgement in response to receiving the first public key of the client device.

18. The non-transitory, computer-readable medium of claim 15, wherein the machine-readable instructions, when executed by the processor, cause the computing device to at least:
store the verifiable credential at a distributed ledger using the wide area network.

19. The non-transitory, computer-readable medium of claim 15, wherein generating the mutually signed request further comprising:
store the mutually signed request in a hash tree data structure in the memory of the computing device.

20. The non-transitory, computer-readable medium of claim 15, wherein the machine-readable instructions, when executed by the processor, cause the computing device to at least:
initiate a decentralized identifier communication (DIDComm) connection with the client device using the wide area network; and
transmit the verifiable credential to the client device in a DIDComm message via the DIDComm connection.

* * * * *